(No Model.)  2 Sheets—Sheet 1.
G. N. VANDERHOEF.
STATION INDICATOR FOR RAILWAY CARS.
No. 440,208.  Patented Nov. 11, 1890.
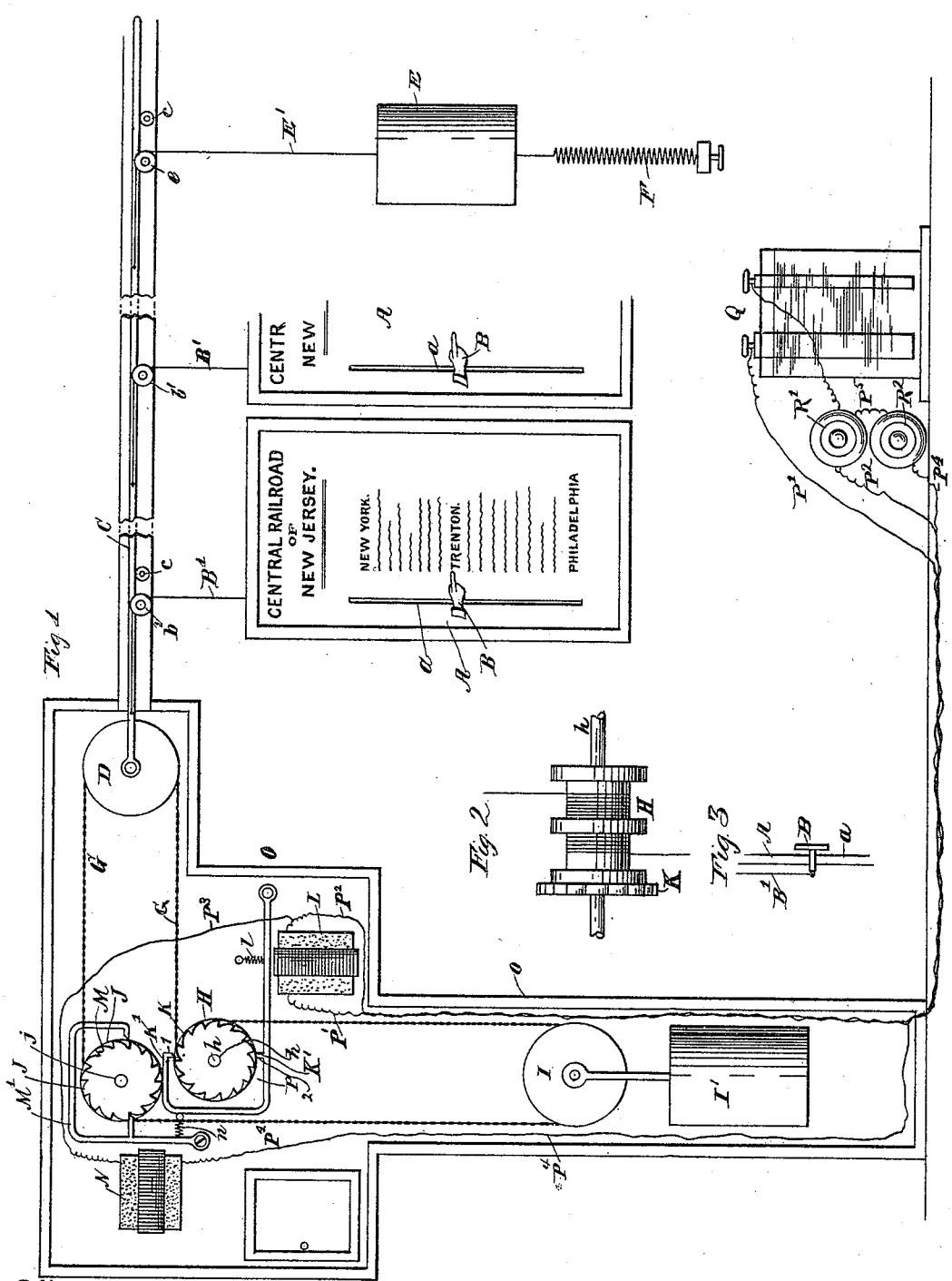
Witnesses
Inventor
George N. Vanderhoef
By his Attorneys Gifford & Brown (No Model.) 2 Sheets—Sheet 2.
G. N. VANDERHOEF.
STATION INDICATOR FOR RAILWAY CARS.
No. 440,208. Patented Nov. 11, 1890.
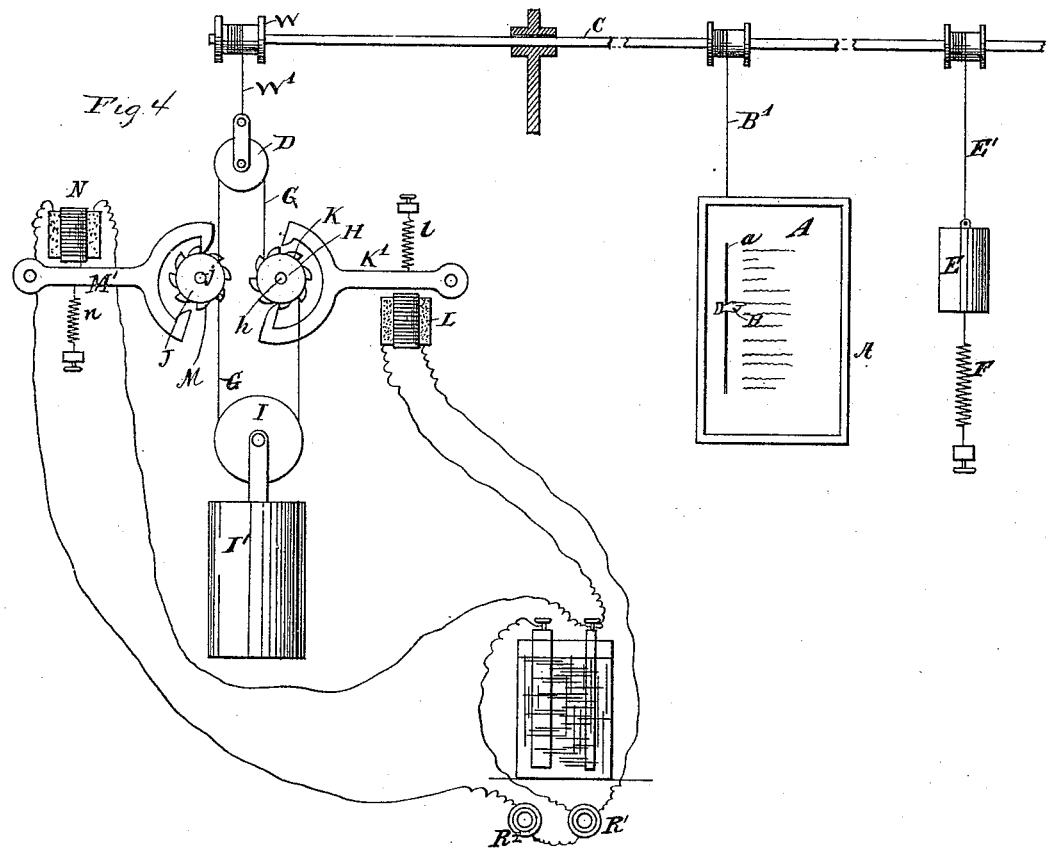
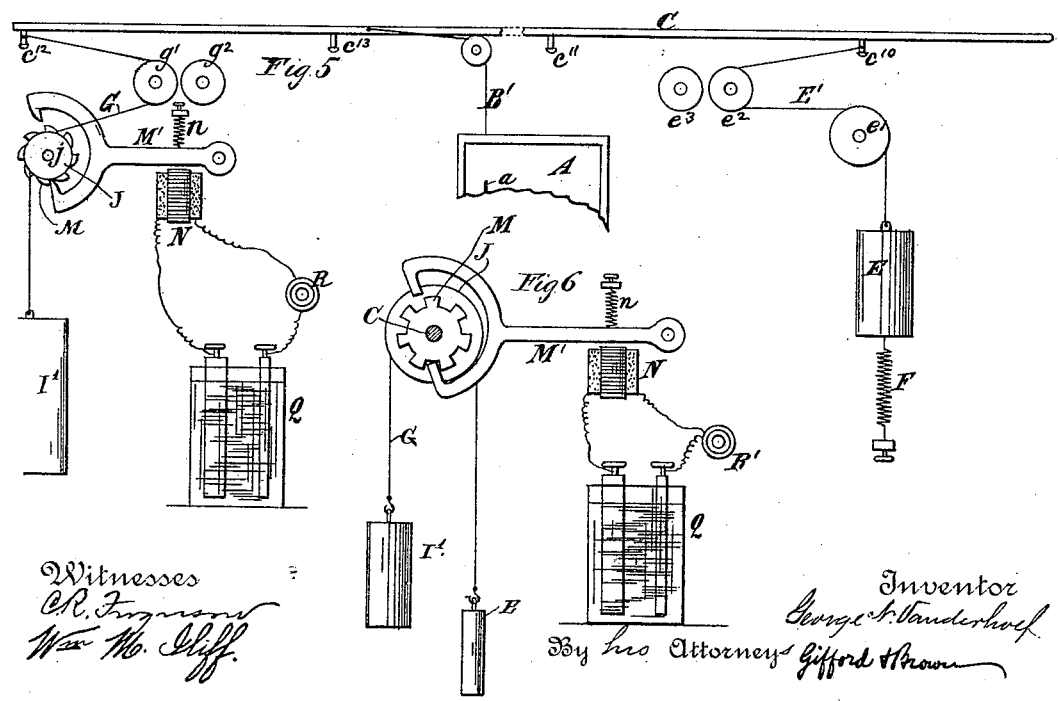
Witnesses
Inventor
George N. Vanderhoef
By his Attorneys Gifford & Brown

UNITED STATES PATENT OFFICE.

GEORGE N. VANDERHOEF, OF BAYONNE, NEW JERSEY, ASSIGNOR TO THE INVENTION COMPANY, OF NEW YORK, N. Y.

STATION-INDICATOR FOR RAILWAY-CARS.

SPECIFICATION forming part of Letters Patent No. 440,208, dated November 11, 1890.

Application filed December 2, 1889. Serial No. 332,339. (No model.)

*To all whom it may concern:*

Be it known that I, GEORGE N. VANDERHOEF, of Bayonne, in the county of Hudson and State of New Jersey, have invented a certain new and useful Improvement in Station-Indicators for Railway Cars, of which the following is a specification.

The object of my improvement is to provide a simple apparatus whereby the stations may be indicated in railway-cars.

I will describe a station-indicator embodying my improvement, and then point out the novel features in the claims.

In the accompanying drawings, Figure 1 is a diagrammatic partly sectional elevation of an indicator embodying my improvement. Fig. 2 is a longitudinal view of a barrel comprised in the indicator. Fig. 3 is an enlarged vertical section taken on the plane of a vertical slot in one of the indicator cards or tablets. Fig. 4 is a diagrammatic elevation of an indicator of modified construction embodying my improvement. Fig. 5 is a diagrammatic elevation of a part of an indicator of modified construction. Fig. 6 is a diagrammatic elevation of a part of another indicator of modified construction.

Similar letters of reference designate corresponding parts in all the figures.

In Figs. 1, 2, and 3, A designates indicator cards or tablets. While I have shown but two, I would state that there may be any suitable number, and preferably one adjacent to each window in a railway-car. In the terms "cards" or "tablets" it is to be understood that I desire to cover all equivalent means for bearing indicator-inscriptions. These indicator cards or tablets, as here shown, bear the names of different stations, and have combined with them pointers or hands B, movable up and down, so as to indicate which will be the next station reached by the car. Each pointer or hand has a shank passing through a vertical slot $a$ in the corresponding card or tablet. A cord or wire B' passes down behind the card or tablet and is attached to the shank of the pointer or hand. By pulling on the cord or wire the pointer or hand will be raised, and by slackening the cord or wire the pointer or hand may be lowered. The pointer or hand of each card or tablet may be weighted or may be combined with a spring to insure its downward movement. The several cords or wires B' are shown as connected with a rod or cable C, which will preferably extend along the upper part of the car above the windows either in a casing or so as to be exposed. The object of this rod or cable is to enable the pointers or hands of all the indicators to be operated in unison. As shown in Fig. 1, the rod or cable is supported by guide-rollers $c$, and the cords or wires B' pass around guide-pulleys $b'$ and are attached to the rod or cable at some distance from the latter. D designates a wheel which, in the present instance, serves to impart longitudinal movement to the rod or cable, the latter being represented as provided at one end with a bearing receiving the shaft of this wheel. The other end of the rod or cable has attached to it a weight or spring. I have shown both a weight E and a spring F as attached to the rod or cable through the agency of a cord or wire E', passing around a guide-pulley $e'$, and connected at some distance from the latter with the rod or cable. The weight and spring, or either if used alone, will serve to keep the rod or cable taut, even when made quite light, and will operate to move the rod or cable in one direction—in the present instance in a direction to lower the pointers or hands. The wheel D receives around it a chain G. Instead of a chain, there may be used any device which is its equivalent—as, for instance, a cord—and I desire in using the word "chain" in this connection to comprehend all equivalent devices. The chain G is attached at one end to a barrel H, supported by a shaft $h$. It is wound for a considerable portion of its length around this barrel and passes thence downwardly around a pulley I, thence around a wheel J, supported by a shaft $j$, thence around the wheel D, and thence back to the barrel H, where it is wound and fastened. This end of the chain may be wound upon and fastened to a different part of the barrel, as illustrated in Fig. 2. The barrel H has affixed to it, or to its supporting-shaft, a ratchet-wheel K, and with this engages a detent K', having two teeth 1 2 constructed to operate like the teeth of a watch-escapement, so that each time the detent is moved from and back into its normal position it will allow the ratchet-wheel to rotate a distance equal to the length of one of its teeth. This detent forms or is provided with the armature of an electro-magnet L. Whenever this electro-magnet is energized, it attracts the detent. On being de-energized it allows the detent to be moved into its normal position by a spring $l$. The movement of the detent thus brought about allows of the movement of the ratchet-wheel to an extent equal to the length of one of its teeth, and thereby allows of the unwinding of the chain from the barrel an equal distance. The pulley I carries a weight I', which is hung upon its journals, and this weight serves to move down the pulley I and unwind the chain whenever this is possible. To the wheel J is affixed a ratchet-wheel M, and combined with this ratchet-wheel is a detent M', constructed and operating like the detent K', already described, when moved back and forth by an electro-magnet N and spring $n$. When a car is traveling in one direction, it will be necessary to lower the hand or pointer, and when the car is traveling in the reverse direction to raise the hand or pointer. This may be done through the electro-magnets L N, providing the barrel H be at proper times rotated to wind up the chain G—as, for instance, at the end of each trip. The wheel D, chain G, barrel H, wheel J, pulley I, weight I', and electro-magnets L N may all be arranged in a case O, located in any convenient part of the car—as, for instance, at one end. The electro-magnets will be included in an electric circuit or circuits extending to circuit-controlling devices located at any part of the car where they will be accessible to one of the train-men. The electro-magnet L has the ends of its coils connected with wires P' P² extending to a battery Q and push-button R'. The wire P² is connected by a wire P³ with one end of the coils of the electro-magnet N, the other end of said coils being connected with a wire P⁴, extending to a push-button R². The push-button R² is connected with the push-button R' by a wire P⁵. Whenever the push-button R' is pressed inward, it will temporarily close the circuit and cause the magnet L to be energized. This will cause the unwinding of the chain G and allow the rod or cable C to be moved under the influence of the weight E and spring F in such direction as to lower the hands or pointers of the several indicator cards or tablets. Whenever the push-button R² is pressed inward, the electro-magnet N will be energized, so as to allow of the partial rotation of the wheel J and corresponding lowering of the pulley I, so as to cause the wheel D to be pulled inward and the rod or cable C to be moved in the direction to elevate the pointers or hands. Obviously the chain G should be combined with the wheel J so as to be unable to slip over the same. It will be readily understood that when the car is moving in one direction the push-button R' will be manipulated, and that when the car is moving in the reverse direction the push-button R² will be manipulated. One touch of a push-button will be sufficient to move the pointers or hands from opposite the names of one station to opposite the names of the next. If, however, the train is one which does not stop at all stations and it is desired to indicate only those stations at which the train will stop, several touches of a push-button may be requisite to adjust the pointers or hands to the next station at which a stoppage will be made.

Turning now to Fig. 4, it will be seen that there are the same indicator cards or tablets combined with pointers or hands operated by cords or wires B'. C in this example of my improvement represents a rotary rod or shaft supported in suitable bearings. The cords or wires B' are wound upon this rod or shaft or upon windlasses attached to it. Near one end the rod or shaft C has attached to it a windlass W, around which is wound a chain or cord W', from the end of which is suspended a wheel D, corresponding to the wheel D first mentioned. The chain G in this instance is attached at its ends to a barrel H and wound for some distance around the same. It passes from the barrel H around the wheel D, thence around wheel J, thence around the pulley I, and thence to the barrel H. The barrel H and wheel J have combined with them ratchet-wheels, detents, electro-magnets, circuits, push-buttons, and an electric battery, as in the example of my improvement first described.

When the electro-magnet N is actuated, the weight I' will cause the lowering of the wheel D, and thus effect the partial rotation of the rod C in such direction as to cause the rising of the pointers or hands. When the electro-magnet L is actuated, the chain G will be unwound and the wheel D allowed to rise, whereupon the weight E and spring F will rotate the rod C in such direction as to lower the pointers or hands.

In Fig. 5 I have shown a sliding rod C, having attached to one end a chain G, and at or near the other end a chain or cord E', which is connected with a weight E. The weight E serves to move the rod in one direction, the chain or cord being passed around a pulley $e'$, and thence around either one of two guide-pulleys $e^2$ $e^3$, and attached to the rod either through an eye $c^{10}$ or an eye $c^{11}$, projecting from the rod. The chain G passes around a wheel J, having affixed to it a ratchet-wheel M, which coacts with a detent M', controlled by an electro-magnet N. To the depending end of the chain G a weight I' is attached. The chain G passes around either one of two guide-pulleys $g'$ $g^2$, and is attached through either one of two eyes $c^{12}$ $c^{13}$. When the car is to travel in one direction, the chain G will be attached to the eye $c^{12}$ of the rod, and the chain or cord E' to the eye $c^{10}$ of the rod.

When so attached, the magnet N will operate to cause the rod to be shifted in such direction as to lower the pointers or hands, because the weight I' is heavier than the weight E. When the rod is desired to raise the pointers or hands, the chain G will be attached to the eye $c^{13}$ and the chain or cord E' to the eye $c^{11}$.

In Fig. 6, C designates a rotary rod or shaft having affixed to it a wheel J, around which is passed a chain G, having attached to one end a heavy weight I' and to the other end a light weight E. Whenever the electro-magnet N is actuated, it will allow the heavy weight I' to produce a partial rotation of the rod or shaft C for the purpose of adjusting the pointers or hands. At the end of each trip made by the car the weights I' and E may be reversed, after which the magnet, by releasing the detent, will cause the rotation of the rod or shaft in the reverse direction.

Obviously the pointers or hands may be stationary and the indicator cards or tablets made movable. This modification would be a mere inversion, and hence I desire to cover it as part of my invention.

I desire to remark that springs may be used as the equivalents of weights in the various forms of apparatus I have described.

What I claim as my invention, and desire to secure by Letters Patent, is—

1. The combination of a number of indicator-tablets, a number of pointers, a connection for producing a relative movement between the indicator-tablets and the pointers common to all the said moving parts for operating them in unison, and electro-magnetic mechanism controlling the movement of the parts, substantially as specified.

2. The combination of a number of indicator-tablets, a number of pointers, a connection for producing a relative movement between the indicator-tablets and pointers common to all the said moving parts for operating them in unison, a weight or spring for moving the connection in the reverse direction, and an electro-magnet controlling the movement of the weight or spring, substantially as specified.

3. The combination of a number of indicator-tablets, a number of pointers, a connection for producing a relative movement between the indicator-tablets and pointers, a rotary part affixed to the connection, a rotary barrel, an electro-magnet controlling the movement of this barrel, a chain secured to and wound around the barrel and around the rotary part which is connected with the connection first named, a wheel having said chain passed around it, an electro-magnet controlling the rotation of said wheel, and a weight connected with the chain, substantially as specified.

4. The combination of a number of indicator-tablets, a number of pointers, a connection for producing a relative movement between the indicator-tablets and pointers, a rotary part affixed to the connection, a rotary barrel, an electro-magnet controlling the movement of this barrel, a chain secured to and wound around the barrel and around the rotary part which is connected with the connection first named, a wheel having said chain passed around it, an electro-magnet controlling the rotation of said wheel, a weight connected with the chain, electric circuits, and circuit-controllers, substantially as specified.

5. The combination of a number of indicator-tablets, pointers, a connecting-rod for producing a relative movement between the cards or tablets and pointers, a rotary part connected with the rod or cable, a barrel H, a ratchet-wheel K, connected with the barrel, a detent K', coacting with this ratchet-wheel, an electro-magnet L and spring $l$ for operating the detent, a wheel J, a ratchet-wheel M, affixed to the wheel J, a detent N', an electo-magnet N and spring $n$ operating this detent, a chain G, passing around the rotary part, which is connected with the said connecting-rod, and around the barrel H and wheel J, and a weight hung upon said chain, substantially as specified.

GEORGE N. VANDERHOEF.

Witnesses:
S. O. EDMONDS,
FRED KEMPER.